United States Patent
Fujita

(10) Patent No.: US 9,380,316 B2
(45) Date of Patent: Jun. 28, 2016

(54) IMAGE PROCESSING APPARATUS, IMAGE PROCESSING SYSTEM AND IMAGE PROCESSING METHOD

(71) Applicant: FUJITSU LIMITED, Kawasaki-shi, Kanagawa (JP)

(72) Inventor: Ryuhei Fujita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 14/598,287

(22) Filed: Jan. 16, 2015

(65) Prior Publication Data
US 2015/0278620 A1 Oct. 1, 2015

(30) Foreign Application Priority Data

Mar. 26, 2014 (JP) ................................ 2014-064758

(51) Int. Cl.
*G06K 9/18* (2006.01)
*H04N 19/44* (2014.01)
*G06K 9/62* (2006.01)
*G06K 9/00* (2006.01)

(52) U.S. Cl.
CPC ............ *H04N 19/44* (2014.11); *G06K 9/00449* (2013.01); *G06K 2209/01* (2013.01)

(58) Field of Classification Search
None
See application file for complete search history.

(56) References Cited

U.S. PATENT DOCUMENTS

| 6,381,368 | B1 | 4/2002 | Kanatsu | |
| 8,948,524 | B2 * | 2/2015 | Chang | H04N 19/147 382/190 |
| 2005/0041873 | A1 * | 2/2005 | Ii | G06K 9/00979 382/232 |
| 2009/0109479 | A1 * | 4/2009 | Kato | G06F 17/243 358/1.15 |
| 2011/0222134 | A1 * | 9/2011 | Kodaira | G06K 9/00449 358/518 |
| 2012/0236199 | A1 * | 9/2012 | Imai | H04N 19/507 348/415.1 |
| 2014/0185103 | A1 * | 7/2014 | Tsugimura | H04N 1/4115 358/426.09 |

FOREIGN PATENT DOCUMENTS

| JP | 7-95395 | 4/1995 |
| JP | 11-167623 | 6/1999 |
| JP | 2006-270199 | 10/2006 |
| JP | 2008-5219 | 1/2008 |

OTHER PUBLICATIONS

Patent Abstracts of Japan, Publication No. 07-095395, published Apr. 7, 1995.

(Continued)

*Primary Examiner* — David F Dunphy
(74) *Attorney, Agent, or Firm* — Staas & Halsey

(57) ABSTRACT

An image processing apparatus includes a computer configured to execute a program to perform an image processing including: creating difference data between first encoded form data and a form format corresponding to the form data, the first encoded form data being acquired by encoding form data according to a first compression parameter; decoding the created difference data; performing character recognition on each of the form data and the decoded difference data; comparing a first result of the character recognition performed on the form data and a second result of the character recognition performed on the decoded difference data, and determining whether the first result and the second result coincide with each other; and outputting the difference data based on a result of the determination of coincidence/noncoincidence of the first result and the second result.

11 Claims, 7 Drawing Sheets

(56) References Cited

OTHER PUBLICATIONS

Patent Abstracts of Japan, Publication No. 11-167623, published Jun. 22, 1999.

Patent Abstracts of Japan, Publication No. 2006-270199, published Oct. 5, 2006.

Patent Abstracts of Japan, Publication No. 2008-005219, published Jan. 10, 2008.

* cited by examiner

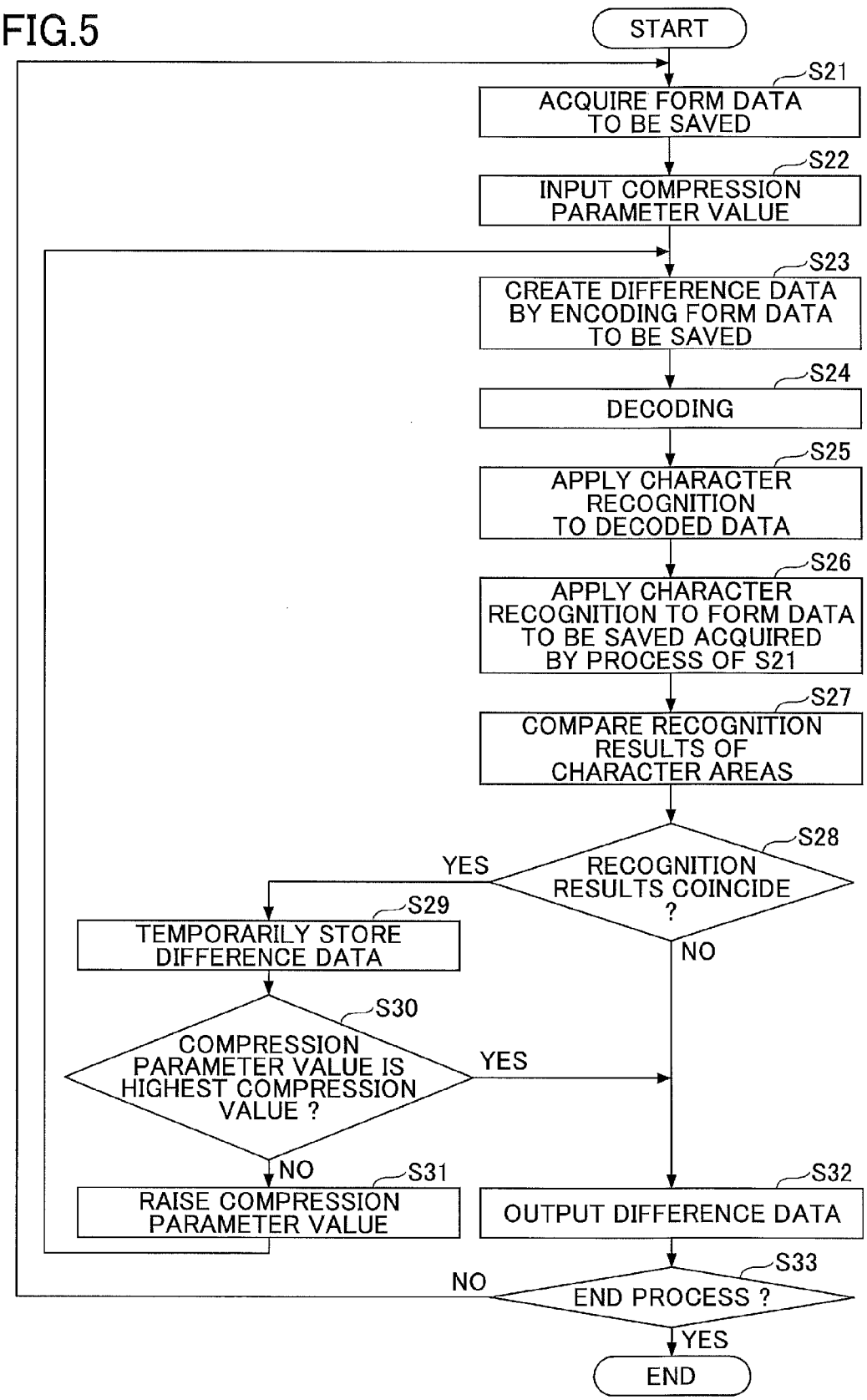

FIG.6

| From | | To | |
|---|---|---|---|
| Date | Sender's Account Number | | |
| Sender's Name | Phone | Recipient's Name | Phone |
| Company | | Company | |
| Address | | Address | |
| City | Prefecture | City | Prefecture |
| Country | Postal Code | Country | Postal Code |

FIG.7

| From | | To | |
|---|---|---|---|
| Date 01/05/15 | Sender's Account Number 123-456 | | |
| Sender's Name Bill Kosugi | Phone 03- ■ | Recipient's Name Taro Shiodome | Phone 03- ■ |
| Company Fujitsu Limited | | Company Fujitsu Limited | |
| Address ■ Nakahara-ku | | Address ■ | |
| City Kawasaki | Prefecture Kanagawa | City Minatoku | Prefecture Tokyo |
| Country Japan | Postal Code ■ | Country Japan | Postal Code ■ |

FIG.8

| DATA SIZE OF FORM MASTER (JPEG/Color) | COMPRESSION PARAMETER VALUE | DIFFERENCE DATA SIZE | COMPRESSION RATIO | ... |
|---|---|---|---|---|
| 1909 kB | 30 | 172 kB | 9.0% | ... |
| | ... | ... | ... | ... |
| | 40 | 74 kB | 3.9% | ... |
| | ... | ... | ... | ... |
| | 50 | 37 kB | 1.9% | ... |

IMAGE PROCESSING APPARATUS, IMAGE PROCESSING SYSTEM AND IMAGE PROCESSING METHOD

CROSS-REFERENCE TO RELATED APPLICATIONS

This application is based upon and claims the benefit of priority of the prior Japanese Patent Application No. 2014-064758, filed on Mar. 26, 2014, the entire contents of which are incorporated herein by reference.

FIELD

The embodiments discussed herein are directed to an image processing technique.

BACKGROUND

When saving image data of a handwritten form or document, first a compression parameter is tentatively set for compressing the image data, and, then, the image data is encoded according to the tentatively set compression parameter. Then, the encoded image data is decoded, and the image quality of the decoded image is checked by a person to determine the compression parameter to be used. The image data is encoded according to the thus-determined compression parameter, and the thus-encoded image data is saved.

The following patent documents disclose a background art.

Patent Document 1: Japanese Laid-Open Patent Application No. 2006-270199
Patent Document 2: Japanese Laid-Open Patent Application No. H11-167623
Patent Document 3: Japanese Laid-Open Patent Application No. H7-95395
Patent Document 4: Japanese Laid-Open Patent Application No. 2008-5219

The method of evaluating an image quality by visual checking by a person depends on one's subjectivity and involves personal equation. Additionally, if the image is decoded according to a compression parameter set by a person, it may be difficult to judge whether the value of the compression parameter is an optimum value. Accordingly, it may be difficult to set an appropriate compression parameter, which causes image data of a form or document to be readable, while reducing an amount of data to be saved.

SUMMARY

There is provided according to an aspect of the embodiments an image processing apparatus including a computer configured to execute a program to perform an image processing including: creating difference data between first encoded form data and a form format corresponding to the form data, the first encoded form data being acquired by encoding form data according to a first compression parameter; decoding the created difference data; performing character recognition on each of the form data and the decoded difference data; comparing a first result of the character recognition performed on the form data and a second result of the character recognition performed on the decoded difference data, and determining whether the first result and the second result coincide with each other; and outputting the difference data based on a result of the determination of coincidence/noncoincidence of the first result and the second result.

There is provided according to another aspect of the embodiments an image processing system system including one or more computers configured to execute a program to cause the computers to perform an image processing including: creating difference data between first encoded form data and a form format corresponding to the form data, the first encoded form data being acquired by encoding form data according to a first compression parameter; decoding the created difference data; performing character recognition on each of the form data and the decoded difference data; comparing a first result of the character recognition performed on the form data and a second result of the character recognition performed on the decoded difference data, and determining whether the first result and the second result coincide with each other; and outputting the difference data based on a result of the determination of coincidence/noncoincidence of the first result and the second result.

There is provided according to a further aspect of the embodiments an image processing method, comprising: creating difference data between first encoded form data and a form format corresponding to the form data, the first encoded form data being acquired by encoding form data according to a first compression parameter; decoding the created difference data; performing character recognition on each of the form data and the decoded difference data; comparing a first result of the character recognition performed on the form data and a second result of the character recognition performed on the decoded difference data, and determining whether the first result and the second result coincide with each other; and outputting the difference data based on a result of the determination of coincidence/noncoincidence of the first result and the second result.

BRIEF DESCRIPTION OF DRAWINGS

FIG. 5 is a flowchart of a second example of the image processing performed in the image processing apparatus;

FIG. 6 is an illustration of an image of a blank form;

FIG. 7 is an illustration of an image of the form illustrated in FIG. 6 that is filled in by handwriting; and FIG. 8 is an illustration for explaining a compression parameter.

DESCRIPTION OF EMBODIMENT(s)

A description will now be given of embodiments with reference to the drawings.

<Outline Structure of Form System as Example of Image Processing System>

Figure 1:
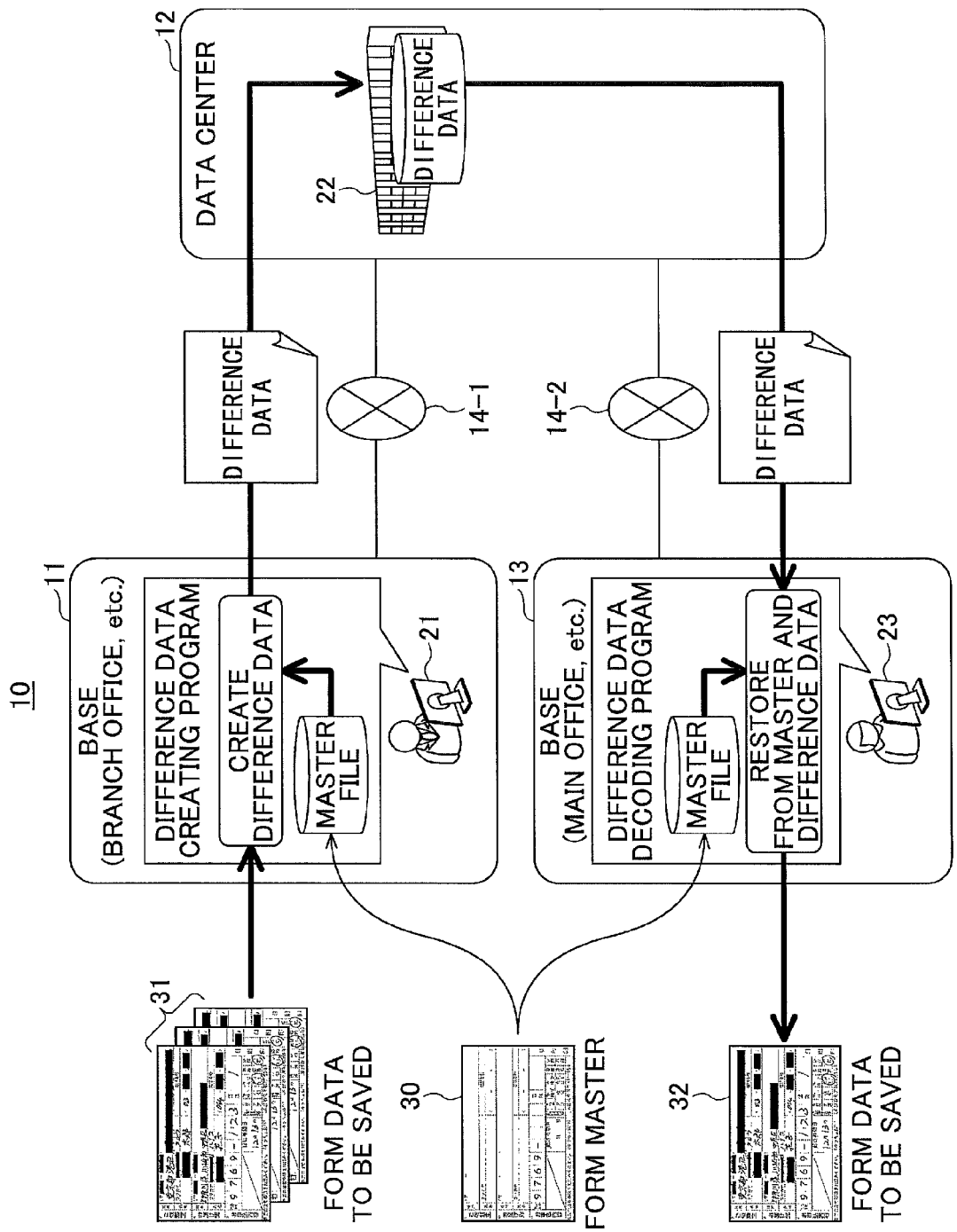
FIG. 1 is an illustration of an outline structure of an image processing system.

FIG. 1 illustrates an outline structure of an image processing system 10. Although the image processing system 10 is explained hereinafter as a form management system that manages image data of a form or document as an example, the image processing system 10 is not limited to the form management system. Moreover, in the following description, it is assumed that the form or document is, for example, an account book, a voucher, etc., that are used for various business transactions and account treatments in a financial business, insurance business, administration, etc. Further, the form or document mentioned in the following description is not limited to the above-mentioned general purpose form or document, and includes, but is not limited to, various form sheets such as a questionnaire form, answer paper, voting paper, etc., that are to be filled with information by handwriting, stamping, printing, etc.

The image processing system illustrated in FIG. 1 includes a first base 11, a data center 12 and a second base 13. The first base 11 and the data center 12 are connected to each other via a communication network 14-1 such as the Internet or a LAN (Local Area Network) in a state where they can transmit or receive data with each other. The data center 12 and the second base 13 are connected to each other via a communication network 14-2 that is the same as the above-mentioned communication network 14-1 in a state where they can transmit or receive data through the communication network 14-2.

The first base 11 is, for example, a branch office or the like of a company. The first base 11 includes one or more image processing apparatuses 21 (only one illustrated in the figure). The image processing apparatus 21 is an example of an information processing apparatus, such as, for example, a personal computer (PC), server, tablet terminal, etc., but the image processing apparatus 21 is not limited to these apparatuses. Registered in a master file of the image processing apparatus 21 is a form master 30 (blank form data) that includes previously set one or more form formats.

The form master 30 may be image data acquired by reading a paper medium such as a form sheet by the image processing apparatus 21 using an image scanner provided in the first base 11, or may be image data acquired from the data center 12. Information (characters, signs, ruled lines, etc.) previously provided in the form master 30 may be monochrome (black and white) printing, or printing in a predetermined color such as read, blue, etc. In such a case, the image scanner preferably acquires, but is not limited to, the form master 30 in color. For example, the image scanner may acquire, for example, the form master 30 in monochrome.

The image processing apparatus 21 acquires the form data 31 (image data), which is to be saved and handwritten in the form master 30, using an image scanner or an image-taking apparatus such as a camera or the like provided in the base 11. The image processing apparatus 31 transmits the acquired form data 31 to be saved to the data center 12, and causes the data center 12 to save the transmitted form data. In this case, the image scanner or image-taking apparatus preferably acquires, but is not limited to, the form data 31 to be saved in color, and may acquire the form data 31, for example, in monochrome.

At this time, the image processing apparatus 21 creates difference data from the form master 30 in order to save the acquired form data 31 to be saved in the data center 12 by reducing a data amount of the form data 31 to be saved. The difference data can be created using a difference data creating program, which is an example of an image processing program according to the present embodiment.

The image processing apparatus 21 first decodes, when creating the difference data, the form data 31 to be saved using a previously set first compression parameter to extract the difference data from the corresponding form data. The image processing apparatus 21 decodes the extracted difference data, and applies a character recognition process to the decoded difference data and the form data 31 to be saved. The image processing apparatus 21 compares results of the character recognitions of both the decoded data and the form data 31 to be saved, and acquires the difference data for saving according to whether the character recognition result of the decoded data coincides with the character recognition result of the form data 31. If the character recognition results do not coincide with each other, the image processing apparatus 21 performs the above-mentioned process using a second compression parameter, which has a compression ratio lower than the first compression parameter. Thus, the image forming apparatus 21 lowers the compression ratio stepwise to render the difference data, which is obtained by compression using the compression parameter when the character recognition results coincide with each other, as the data to be saved.

The image processing apparatus 21 may raise the compression ratio stepwise until the character recognition results become not coincide with each other in a reverse manner with the above-mentioned method so as to render, when the character recognition results become not coincide with each other, the difference data compressed by the immediately preceding compression parameter.

The image processing apparatus 21 sends the difference data acquired by the above-mentioned methods to the data center 12 by attaching identification information for identifying each difference data to the difference data to be sent.

The data center 12 includes a storage device (storage part) 22 for storing various kinds of data. The storage device 22 is, for example, a database server, but is not limited to the database server, and may be a cloud server or the like that is achieved by, for example, cloud computing including one or more information processing apparatuses. The data center 12 receives the difference data sent from the first base 11 through the communication network 14-1, and saves the received difference data in the storage device 22. The data center 12 sends the difference data saved in the storage device 22 to the second base 13 through the communication network 14-2.

The second base 13 is, for example, a head office of a company that performs management by collecting information from each branch office. The second base 13 includes one or more image processing apparatuses (restoring parts) 23 (only one illustrated in the figure). The image processing apparatus 23 restores form data (image data) 32 to be saved using the difference data acquired from the data center 12 and the master file in which the form master 30 is stored. The master file may be acquired from the data center 12. The image processing apparatus 23 may send an inquiry about the difference data to the data center 12 based on the identification information in order to perform the above-mentioned restoration by acquiring the corresponding difference data. For example, the image processing apparatus 23 may perform the restoration using, but not limited to, a difference data decoding program, which is an example of an image processing program.

The above-mentioned form master 30 and form data 31 and 32 to be saved may be, but not limited to, image data compressed according to a compression format such as, for example, the Joint Photographic Experts Group (JPEG) or the Tagged Image File Format (TIFF).

Each of the communication networks 14-1 and 14-2 may be, for example, a wired network or a wireless network or a combination of the aforementioned. The communication networks 14-1 and 14-2 may be the same communication network.

Although the difference data is saved in the data center 12 and managed by the data center 12 in the image processing system 10 illustrated in FIG. 1, the difference data may be directly sent from the first base 11 (branch office or the like) to the second base 13 (main office) through a communication network. In the present embodiment, the process performed in the image processing apparatus 21 and the process performed in the image processing apparatus 23 may be performed by only one apparatus.

<Functional Structure of Image Processing Apparatus 21>

Figure 2:
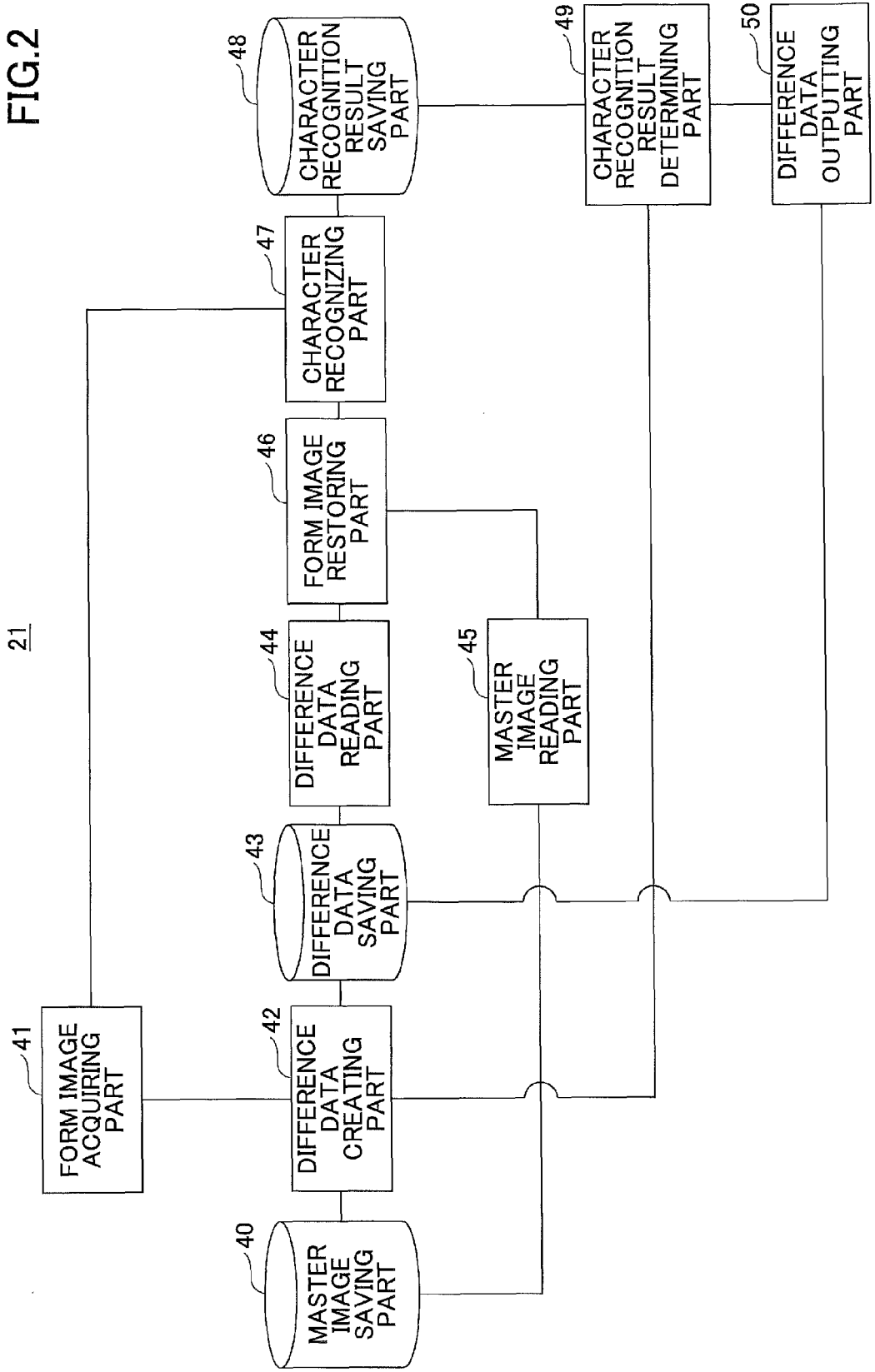
FIG. 2 is a block diagram of a functional structure of an image processing apparatus.

A description is given below of a functional structure of the image processing apparatus 21. FIG. 2 is a block diagram illustrating a functional structure of the image processing apparatus 21. The image processing apparatus 21 includes, as illustrated in FIG. 2, a master image saving part 40, form image acquiring part 41, difference data creating part 4, difference data saving part 43, difference data reading part 44, master image reading part 45, form image restoring part 46, character recognizing part 47, character recognition result saving part 48, character recognition result determining part 49 and difference data outputting part 50. The master image saving part 40, difference data saving part 43 and character recognition result saving part 48 may be incorporated into a single storing part.

The master image saving part 40 is an example of the above-mentioned master file. The master image saving part 40 saves the image data of the one or more kinds of form masters 30 that are previously set. Each form master 30 may be acquired from the above-mentioned data center 12.

The form image acquiring part 41 acquires the above-mentioned form data 31 to be saved. The form image acquiring part 41 may read a paper medium such as a form paper to be saved by an image scanner, or may take an image by an image-taking apparatus or the like.

The difference data creating part 42 creates the difference data between the form master 30 stored in the master image saving part 40 and the form data 31 to be saved that is acquired by the form image acquiring part 41. The form master 30 corresponds to the form format of the form data 31 to be saved. These can be acquired, by being associated with each other according to the previously set identification information or the like, but it is not limited to this. For example, the difference data creating part 42 may search and extract an image having a highest collation with the form data 31 to be saved from among a plurality of kinds of the form masters (master images) 30 saved in the master image saving part 40.

The difference data creating part 42 encodes, for example, the form data 31 to be saved using the previously set first compression parameter 31, and creates the difference data between the encoded form data and the form master (the form format corresponding to the form data 31 to be saved). The compression parameter is, for example, a quantization parameter or the like having a numerical value that causes an image quality to be lower (more noises) as it becomes higher, but is not limited to this.

For example, the difference data creating part 42 may create, as the difference data, information regarding a motion vector and information regarding a motion compensation inter-frame prediction error with respect to the form master (master image) 30 of the form data 31 to be saved. In this case, a data amount of the created difference data can be reduced even if the positioning of the form master (master image) 30 of the form data 31 to be saved is not performed. Specifically, the process is performed by dividing both images into block units (a predetermined block unit of 4×4 pixel unit, 8×8 pixel unit, etc.). The difference data creating part 42 may create the difference data by performing a comparison according to a predetermined pixel unit based on, for example, color information, color component, gradation (gray scale), etc., but it is not limited to this. The difference data creating part 42 may perform a data compressing process with respect to the created difference data. The above-mentioned each process performed in the difference data creating part 42 can be materialized by executing, for example, the difference data creating program illustrated in FIG. 1.

The difference data saving part 43 temporarily saves the difference data crated by the difference data creating part 42. The difference data reading part 44 reads the difference data saved in the difference data saving part 43. The master image reading part 45 reads the master image stored in the master image saving part 40.

The form image restoring part 46 performs the image processing to restore the form data by performing decoding using the difference data read by the difference data reading part and the form master 30 (master image) read by the master image reading part 45.

The character recognizing part 47 applies a character recognition process to each of the form data 31 to be saved acquired by the form image acquiring part 41 and the form data restored by the form data restoring part 46. The character recognition process can be performed using, for example, an optical character recognition (OCR), but it is not limited to this, and other character recognizing method may be used. In the present embodiment, the form operation preferably uses the OCR because the character recognition is an important point.

The character recognizing part 47 may perform character recognition on the entire area of the form data, or may perform character recognition on a previously set partial area of the form data. The above-mentioned partial area may be a character area such as, for example, a portion (for example, a name, an address, etc.) containing important information (for example, a telephone number, password, amount of money, etc.) or Chinese characters (kanji characters) and characters that are difficult to be recognized by the OCR process. Additionally, the above-mentioned partial area is preferably, for example, an area of a handwrite input portion, but is not limited to this. Further, information having a highest priority in the handwriting input area may be set as the partial area. Which area is subject to the character recognition is previously set by a user. The character recognizing part 47 causes the character recognition result saving part 48 to save each character recognition result.

The character recognition result determining part 49 compares the character recognition results of the form data 31 to be saved acquired by the form image acquiring part 41 and the form data restoring part 46 that are stored in the character recognition result saving part 48, and determines whether the contents are coincident. In the comparison of the character recognition results, if the character recognition is not accurately performed and characters are recognized as incorrect characters or there are corrupted characters or the like, the determination is made whether character recognition results including those characters are coincident.

For example, the character recognition result determining part 49 may acquire a number of coincident characters or a number of noncoincident characters by comparison of each character based on all of the recognized characters, and may calculate the rate of concordance based on the number of acquired characters. Additionally, the character recognition result determining part 49 may determines that the character recognition results are coincident if the calculated rate of concordance is greater than or equal to a previously set threshold value (for example, rate of concordance is 90%). The above-mentioned threshold value may be changed in response to, for example, the type of the form master 30 or user setting.

The character recognition result determining part 49 acquires the difference data to be saved according to the above-mentioned comparison result as to whether the character recognition results are coincident. For example, if the above-mentioned character recognition results do not coincide with each other, the character recognition result determining part 49 instructs the difference data creating part 42 to create the difference data again by using the second compression parameter lower than the first compression parameter, and further causes the difference data creating part 42 to perform the above-mentioned subsequent stage process. As mentioned above, the character recognition result determining part 49 lowers the compression ratio, which is used when creating the difference data, stepwisely to render the difference data, which is obtained by compression using the compression parameter when the character recognition results coincide with each other, as the data to be saved.

If the character recognition results do not coincide from the beginning, the character recognition result determining part 49 instructs the difference data creating part 42 to create the difference data again by using the second compression parameter higher than the first compression parameter in a reverse manner as the above-mentioned method, and further causes the difference data creating part 42 to perform the above-mentioned subsequent stage process. As mentioned above, the character recognition result determining part 49 may raise the compression ratio, which is used when creating the difference data, stepwisely, so as to render, when the character recognition results become not coincident, the difference data, which is compressed according to the immediately preceding compression parameter used when the character recognition results are coincident, as the data to be saved.

The difference data outputting part 50 acquires the difference data, which is determined by the character recognition result determining part 49 and selected as the data to be saved, from the difference data saving part 43. The difference data outputting part 50 sends the acquired difference data to the above-mentioned data center 12.

Accordingly, in the present embodiment, the difference data, which is encoded by the compression parameter in a range where the character recognition can be performed, can be saved, which reduces an amount of data to be saved. Additionally, according to the present embodiment, a transmission efficiency of the data transmission on the network can be improved because the data amount of the difference data to be transmitted can be reduced.

In the above-mentioned image processing apparatus 23 of the second base 13, the form data 32 to be saved, from which the same character recognition result as the form data 31 to be saved can be obtained, can be acquired by restoring the form data by using the above-mentioned difference data and the form master 30 of the master file. In the restoring process, if the information regarding a motion vector and the information regarding a motion compensation inter-frame prediction error are created as the difference data by performing the motion compensation inter-frame prediction when creating the difference data, first a predicted image is created by using the form master 30 and the information regarding a motion vector contained in the difference data. Then, the image of the form is restored by adding a prediction error to the created predicted image by using the information regarding the motion compensation inter-frame prediction error contained in the difference data. However, the contents of the restoring process are not limited to the aforementioned. Additionally, the above-mentioned restoring process can be materialized by executing, for example, the difference data decoding program illustrated in FIG. 1.

<Hardware Structure>

Figure 3:
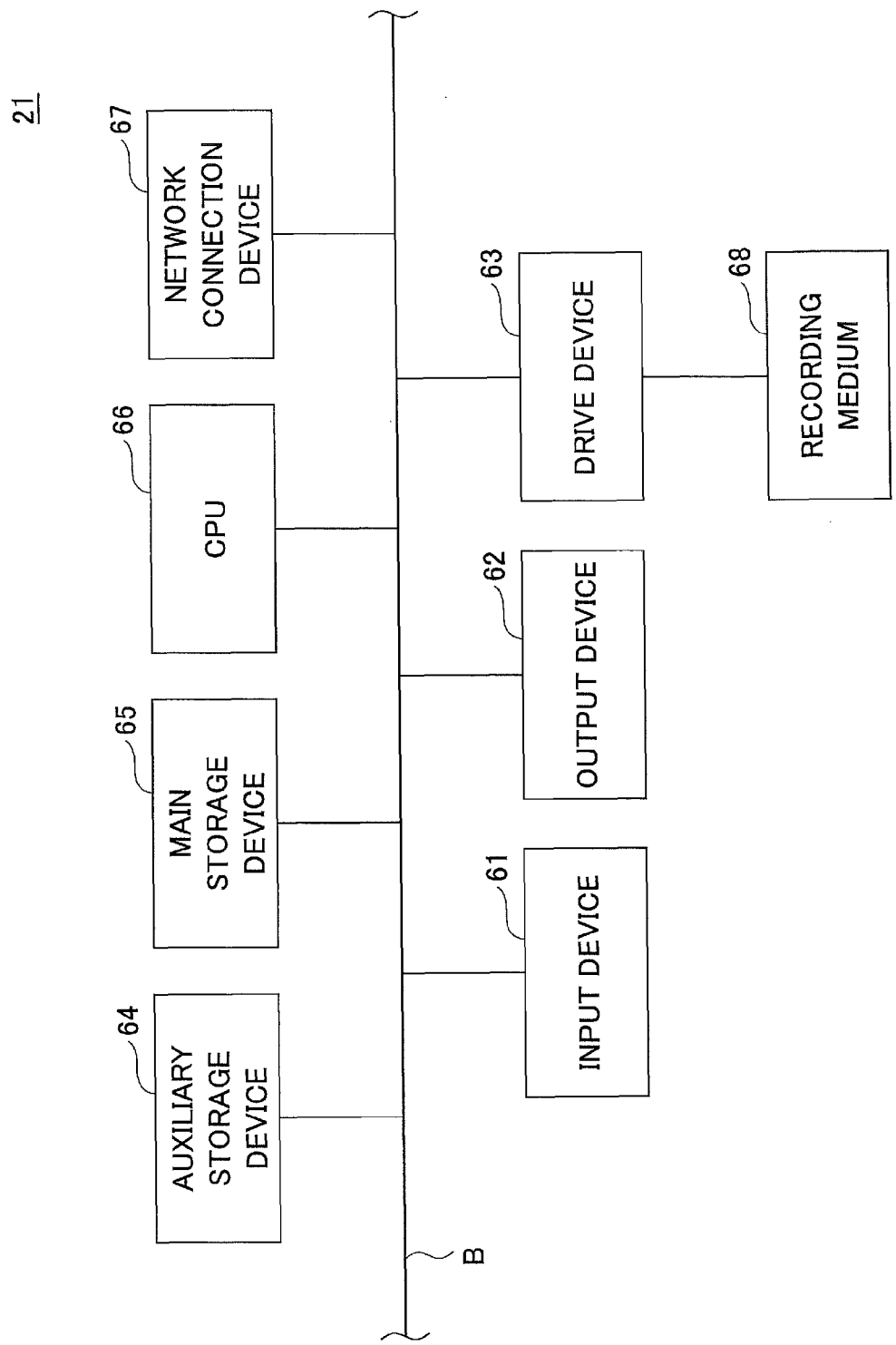
FIG. 3 is a block diagram of a hardware structure of the image processing apparatus.

A description is given below, with reference to FIG. 3, of a hardware structure of the image processing apparatus 21. FIG. 3 is a block diagram illustrating a hardware structure of the image processing apparatus 21. A computer body of the image processing apparatus 21 is configured to include an input device 61, output device 62, drive device 63, auxiliary storage device 64, main storage device 65, a central processing unit (CPU) 66 and a network connection device 67 that are mutually connected by a system bus B.

The input device 61 includes a keyboard and a pointing device such as a mouse that are operated by a user of the image processing apparatus 21 and an audio input device such as a microphone. The input device 61 receives an input such as a program execution command from a user, various kinds of setting information, information for activating a program, etc.

The output device 62 includes a display that displays various kinds of window and data necessary for operating the computer body to perform processing in the present embodiment. The output device 62 also displays progress and result of execution of a program according to the image processing program executed by the CPU 66. Additionally, the output device 62 presents the above-mentioned results of processing to the user by printing it on a printing medium such as a paper.

In the present embodiment, the execution program installed in the computer body is provided by a portable recording medium 68 or the like. The recording medium on which the program is recorded can be set in the drive device 63. The execution program recorded on the recording medium 68 is stored in the auxiliary storage device 64 by being read from the recording medium 68 by the drive device 63 and is sent to the auxiliary storage device 64.

The auxiliary storage device 64 is a storage unit such as, for example, a hard disk drive (HDD), solid state drive (SSD), etc. In the present embodiment, the auxiliary storage device 64 stores the execution program and the image processing program provided in the computer based on a control signal from the CPU 66, and inputs or outputs the programs if necessary. The auxiliary storage device 64 can read necessary information from the stored information and write necessary information therein based on a control signal from the CPU 66.

The main storage device 65 stores the execution program read from the auxiliary storage device 64 by the CPU 66. The main storage device 65 includes a read only memory (ROM) and/or a random access memory (RAM). The auxiliary storage device 64 and the main storage device 65 correspond to, for example, the above-mentioned master image saving part 40, difference data saving part 43 and character recognition result saving part 48.

The CPU 66 materializes each process by controlling the process of the entire computer, such as various computations, input and output of data with each hardware structure part, based on a control program such as an operating system (OS) and the execution program stored in the main storage device 65. Various kinds of information necessary for the execution of the programs can be acquired from the auxiliary storage device 64, and the result of execution can be stored in the auxiliary storage device 64.

Specifically, the CPU 66 executes the image processing program stored or installed in the auxiliary storage device 64 based on a program execution command sent from the input device 61 in order to perform a process corresponding to the program on the main storage device 65.

For example, the CPU 66 performs an execution control of the above-mentioned various processes by executing the image processing program. For example, the CPU 66 performs various processes including the acquisition of the form data 31 to be saved by the form image acquiring part 41, the creation of the difference data by the difference data creating part 42, the reading of the difference data by the difference data reading part 44, the reading of the form master 30 by the master image reading part 45, etc. Additionally, the CPU 66 performs various processes including the restoration of the form data by the form image restoring part 46, the character recognition by the character recognizing part 47, the determination of the character recognition results by the character recognition determining part 49, the output of the difference data by the difference data outputting part 50. The contents of the process performed by the CPU 66 are not limited to the aforementioned.

The network connection device 67 acquires the execution program and setting information from an external device (for example, the storage device 22 of the data center 12) connected to the communication network 14-1 by connecting to the communication network 14-1 based on a control signal from the CPU 66. Additionally, the network connection device 67 can provide an execution result obtained by executing a program (for example, the difference data) or the execution program itself in the present embodiment to an external device.

The recording medium 68 is, for example, a storage device such as a compact disk (CD), a digital versatile disk (DVD), SD memory card, universal serial bus (USB) memory, etc., but is not limited to the aforementioned.

By installing the execution program (for example, the image processing program or the like) in the hardware structure illustrated in FIG. 3, the image processing in the present embodiment can be achieved by the hardware resources and the software resources cooperating with each other. The hardware structure illustrated in FIG. 3 is applicable to the above-mentioned storage device 22 and image processing apparatus 23.

Figure 4:
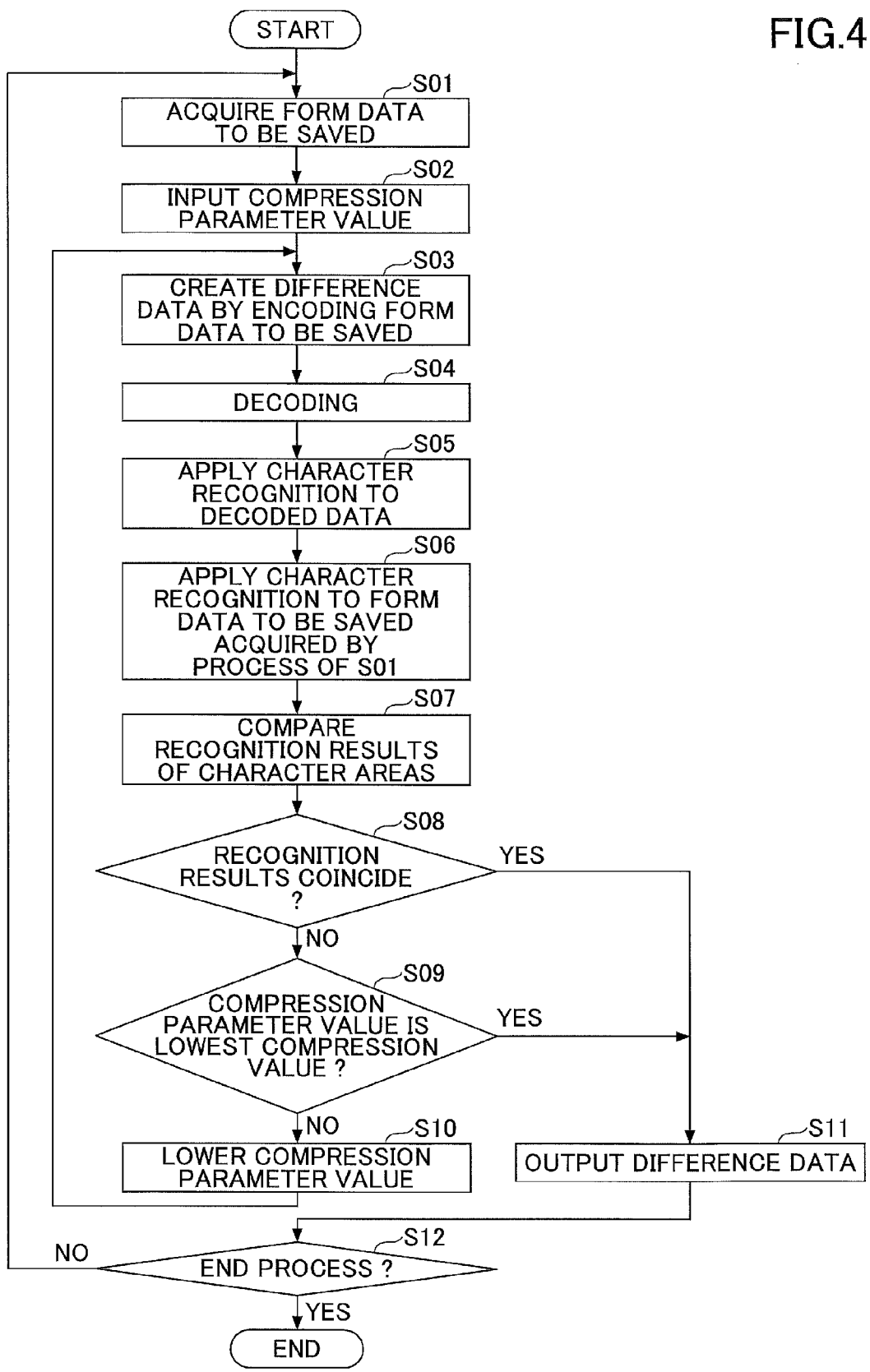
FIG. 4 is a flowchart of a first example of an image processing performed in the image processing apparatus.

<Image Processing>
A description is given below, with reference to FIG. 4, of an example of the image processing in the present embodiment
<FIRST EXAMPLE>
FIG. 4 is a flowchart of a first example of the image processing according to the present embodiment. In the first example, the image processing, which causes the compression parameter value to change stepwisely from a low image quality to a high image quality, is performed in creating the difference data. If it is a low image quality, there is a low possibility of reaching the same character recognition result, and the smallest data amount is achieved when using the compression parameter value which becomes equal first. Accordingly, in the first example, a description is given of a process of acquiring an image corresponding to the smallest data amount.

In the first example illustrated in FIG. 4, the form image acquiring part 41 acquires the form data 31 to be saved, such as a handwritten application form or the like (step S01). Then, the difference data creating part 42 inputs the compression parameter value (QP value) of a previously set initial value (step S02). In the first example, a value (for example, a compression value of 51%) that achieves a high compression (a low image quality) is set as the initial value, but the initial value is not limited to such a value.

Then, the difference data creating part 42 creates the difference data by encoding the form data 31 to be saved (step S03). When the form data 31 to be saved is acquired as image data taken by a camera or the like, the encoding process in the process of step S03 can encode the image data according to a standard such as H.264, moving picture experts group (MPEG), etc. Additionally, when the form data 31 to be saved is acquired as image data, the image data can be compressed, but is not limited to, according to JPEG, TIFF, etc. The created difference data is stored in, for example, the difference data saving part 43.

Then, the form image restoring part 46 decodes the encoded data (step S04). In the process of step S04, the form image restoring part 46 performs decoding using the difference data created in the process of step S03 and the form master 30 to restore the form data. In the process of step S04, decoding is performed using a decoding method corresponding to the method of encoding in the process of the above-mentioned step S03.

Then, the character recognizing part 47 performs character recognition on the data (form data) decoded by the process of step S04 (step S05). Additionally, the character recognizing part 47 performs character recognition on the original form data 31 to be saved acquired by the process of step S01 by OCR or the like (step S06). In the process of steps S05 and S06, the character recognition may be performed on entire data or only a predetermined area. By performing character recognition on only a predetermined area, the character recognition process according to, for example, OCR or the like can be speeded up. For example, a character area, which includes only a portion containing important information or kanji characters difficult to be OCR-processed (for example, name, address, etc.), may be set as the predetermined area.

Then, the character recognition result determining part 49 compares the recognition results of the previously set character areas (step S07), and determines whether the recognition results coincide with each other (step S08). If the recognition results do not coincide (NO in step S08), the character recognition result determining part 49 determines whether the compression parameter value is the lowest compression value within a previously set compression range (step S09). If the compression parameter value is not equal to the lowest compression value (NO in step S09), the compression parameter value is lowered by a predetermined magnitude to change the compression parameter value in a direction of raising the image quality (the second compression parameter) (step S10), and, then, the process returns to step S03 to perform the subsequent process with a different compression value. The range of change (range of reduction) in the compression parameter in the process of step S10 may be set to a fixed value, or the compression parameter value may be changed according to a predetermined value used as a reference.

On the other hand, if it is determined in the process of step S08 that the recognition results coincide with each other (YES in step S08), the difference data outputting part 50 outputs the difference data (step S11). Additionally, if it is determined in the process of step S09 that the compression parameter value is equal to the lowest compression value within the previously set compression range (YES in step S09), the difference data outputting part 50 outputs the difference data at that time because the compression parameter value cannot be reduced any more (step S11).

Then, it is determined whether the process is ended (step S12). If the process is not ended (NO in step S12), the process returns to step S01 to perform the same process on another form data 31 to be saved and output the difference data which is compressed by an appropriate compression ratio for each form data to be saved. If there is an end instruction received from, for example, a user or if the difference data has been output for all of the form data to be saved, it is determined in the process of step S12 that the process is ended. If the process is ended (YES in step S12), the image processing apparatus 21 ends the first example of the image processing.

According to the above-mentioned first example, the difference data, which is encoded by the compression parameter of a high compression ratio within a range in which character recognition can be performed, can be saved, and, thereby, the data amount of the data to be saved can be reduced.

<SECOND EXAMPLE>

A description is given below, with reference to FIG. 5, of a second example of the image processing according to the present embodiment. FIG. 5 is a flowchart of a second example of the image processing. In the second example, the image processing is performed, contrary to the first example, by changing the compression parameter value from a high image quality to a low image quality. If it is a high quality image, there is a high possibility of the character recognition results coinciding with each other at the beginning, but they become not coincident if the image quality is lowered stepwisely. Accordingly, in the second example, the difference data, which is temporarily stored at a time immediately before the time at which the results become not coincident, is output. Thus, a data amount for which the compression parameter value is the lowest value is achieved. Accordingly, in the second example, a description is given of a process of acquiring an image for which the compression parameter value is the lowest.

In the example of FIG. 5, the form image acquiring part 41 acquires the form data 31 to be saved, such as a handwritten application form (step S21). Then, the difference data creating part 42 inputs the compression parameter value (QP value) (first compression parameter) of the previously set initial value (step S22). Although a value such as the value (for example, a compression ratio of 1%) for which a low compression (high image quality) is achieved is set as an initial value, the initial value is not limited to this.

Then, the difference data creating part 42 creates the difference data by encoding the form data 31 to be saved (step S23). The encoding process in step S23 can be the same process as the above-mentioned first embodiment. The created difference data is stored in, for example, the difference data saving part 43.

Then, the form image restoring part 46 decodes the encoded data (step S24). In the process of step S24, the form image restoring part 46 performs decoding using, for example, the difference data created in the process of step S23 and the form master 30 so as to restore the form data. In the process of step S24, the decoding is performed using the decoding method corresponding to the method of encoding in the process of the above-mentioned step S23.

Then, the character recognizing part 47 performs character recognition on the encoded data by OCR or the like (step S25). Additionally, the character recognizing part 47 performs character recognition on the original form data 31 to be saved acquired in the process of step S21 by OCR or the like (step S26). In the process of steps S25 and S26, similar to the first example, the character recognition may be performed on the entire data or may be performed on only a predetermined area.

Then, the character recognition result determining part 49 compares the recognition results of the previously set character area (step S27), and determines whether the recognition results coincide with each other (step S28). If the recognition results coincide (YES in step S28), the character recognition result determining part 49 temporarily saves the difference data (S29), and determines whether the compression parameter value is the highest compression value within a previously set compression range (step S30). If the compression parameter value is not the highest compression value (NO in step S30), the compression parameter value is raised by a predetermined magnitude to change the compression parameter value in a direction of reducing the image quality (the second compression parameter) (step S31), and, then, the process returns to step S23 to perform the subsequent process with a different compression value. The range of change (range of reduction) in the compression parameter in the process of step S31 may be set to a fixed value, or the compression parameter value may be changed according to a predetermined value used as a reference.

On the other hand, if it is determined in the process of step S28 that the recognition results do not coincide with each other (NO in step S28), the difference data outputting part 50 outputs, in the process of step S29, the difference data at the time when the temporarily stored recognition results coincide (step S32). The thus-output difference data is the difference data compressed by the compression parameter value, which is set immediately before the time at which the recognition results become not coincident.

Additionally, if it is determined in the process of step S30 that the compression parameter value is equal to the highest compression value within the previously set compression range (YES in step S30), the difference data outputting part 50 outputs the difference data at that time because the compression parameter value cannot be raised any more (step S32).

Then, it is determined whether the process is ended (step S33). If the process is not ended (NO in step S33), the process returns to step S21 to perform the same process on another form data 31 to be saved and output the difference data which is compressed by an appropriate compression ratio for each form data to be saved. If there is an end instruction received from, for example, a user or if the difference data has been output for all of the form data to be saved, it is determined in the process of step S33 that the process is ended. If the process is ended (YES in step S33), the image processing apparatus 21 ends the second example of the image processing.

According to the above-mentioned second example, similar to the above-mentioned first example, the difference data, which is encoded by the compression parameter of a high compression ratio within a range in which character recognition can be performed, can be saved, and, thereby, the data amount of the data to be saved can be reduced.

<Image Example>

A description is given below, with reference to FIGS. 6 and 7, of examples of the image according to the present embodiment. FIG. 6 is an illustration of an image of a blank form. The image illustrated in FIG. 6 corresponds to the form master (master image) 30. FIG. 7 is an illustration of an image of the form illustrated in FIG. 6 that is filled in by handwriting. The image illustrated in FIG. 7 corresponds to the form data (form image) 31 and 32. The types of the images are not limited to the illustrated images.

FIG. 6 illustrates image data acquired by reading a form, which is printed in a predetermined color (for example, red or blue) according to a previously set form format, by a color image scanner or the like. The image data illustrated in FIG. 7 is acquired by reading the form illustrated in FIG. 6 that is handwritten by a user by an image scanner or the like.

The information containing handwritten characters such as illustrated in FIG. 7 is saved as, for example, trail information. In such a case, the difference data, which is compressed by an appropriate compression ratio, is created and saved according to the above-mentioned image processing in the present embodiment so that the capacity of the the storage device for storing the form data is prevented from being greatly large. The area to be subjected to the character recognition by the above-mentioned character recognizing part 47 preferably includes the handwritten portion illustrated in FIG. 7, but not limited to that illustrated in FIG. 7. For example, an entry column such as a portion for writing a name or a present address may be set as the area to be subjected to the character recognition. Thereby, a processing speed is raised and an appropriate comparison to determine coincidence and non-coincidence of the character recognition results can be performed, which permits acquisition of the difference data compressed by an appropriate compression ratio.

Accordingly, an increase in the system cost can be prevented and inconvenience in the system operation can be eliminated. Additionally, the form data usable as trail information can be restored by using the difference data saved in the data center 12 or the like.

<Compression Parameter>

A description is given below, with reference to FIG. 8, of the above-mentioned compression parameter. FIG. 8 is an illustration for explaining the compression parameter. In the example of FIG. 8, compression parameter values for a data size of the form master 30 (JPEG/Color) and a difference data size and compression ratio for each compression parameter value are illustrated. In the example of FIG. 8, a compression range of the compression parameter value of 30 to 50 is set with respect to the data size "1909 kB" of the form master 30. In the present embodiment, as illustrated in FIG. 8, the compression range can be set by being corresponded to a predetermined condition such as a data size of the form master 30, but is not limited to this. In the present embodiment, for example, the compression range may be set according the the data size of the form data 31 to be saved, or may be processed by setting the same range (for example, the compression parameter values of 1 to 51) to all of the form masters 30 and form data 31. Additionally, a range of change used when changing the compression parameter may be increased or decreased step by step, or may be changed on a five-step or ten-step basis. Although the compression parameter is more coarsely set as the range of change is set to be larger, the processing time is reduced.

In the example of FIG. 8, because a quantization parameter is used as the compression parameter, the image quality becomes lower as the value of the compression parameter is set to a larger value. However, the value of the compression parameter in the present embodiment is not limited to the quantization parameter, and any parameter with which the image quality becomes higher as the value is set smaller may be used. In this case, in the above-mentioned first and second examples of the image processing, such a method is easily applicable by reversing the increase and decrease of the compression parameter value in the process of changing the compression parameter from the first compression parameter to the second compression parameter.

As mentioned above, according to the present embodiment, the difference data, which is encoded by the compression parameter of a high compression ratio within a range in which the character recognition can be performed, can be saved, thereby reducing an amount of data to be saved. For example, in the present embodiment, the character recognition result of the image to be saved and the character recognition results of the image acquired by encoding the difference data are compared with each other, and the compression parameter is changed according to the result of comparison and the character recognition results are compared again. By repeating such a process, a boundary between a parameter value with which the character recognition results coincide with each other and a parameter value with which the character recognition results do not coincide can be acquired. Thereby, for example, in the present embodiment, an amount of data to be saved by creating the difference between the encoded form data and the form format while changing the compression parameter and saving the difference created when the character recognition result of the data of the encoded difference and the character recognition result of the form data coincide with each other.

Moreover, in the present embodiment, the full automatic compressing process for which a person is not involved can be achieved as a form compressing process. Thereby, not only a real-time process but also a batch process can be automatically performed. Additionally, if a person determines the compression parameter value, a value having a certain margin is set to the compression parameter in order to correspond to all form data to be saved, however, in the present embodiment, a compression ratio generating no waste can be set for each form data of the data to be saved, which materializes a further reduction of an amount of data. Further, in the present embodiment, because the data amount of the difference data to be transmitted can be reduced, the transmission efficiency on the network in the data transmission can be improved.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention (s) has(have) been described in detail, it should be understood that the various changes, substitutions, and alterations could be made hereto without departing from the spirit and scope of the invention.

What is claimed is:

1. An image processing apparatus comprising a computer configured to execute a program to perform an image processing including:
   creating difference data between first encoded form data and a form format corresponding to the form data, the first encoded form data being acquired by encoding form data according to a first compression parameter;
   decoding the created difference data;
   performing character recognition on each of the form data and the decoded difference data;
   comparing a first result of the character recognition performed on the form data and a second result of the character recognition performed on the decoded difference data, and determining whether the first result and the second result coincide with each other; and
   outputting the difference data based on a result of the determination of coincidence/noncoincidence of the first result and the second result.

2. The image processing apparatus as claimed in claim 1, wherein, when the first result and the second result coincide with each other, the difference data to be output is rendered to be the difference data created when the result of the determination of coincidence/noncoincidence has become coincidence, and when the first result and the second result do not coincide with each other, another difference data is created based on second encoded form data, which is acquired by encoding the form data according to a second compression parameter having a compression ratio lower than said first compression parameter.

3. The image processing apparatus as claimed in claim 1, wherein, when the first result and the second result coincide with each other, another difference data is created based on second encoded form data that is acquired by encoding the form data according to a second compression parameter having a compression ratio higher than said first compression parameter, and when the first result and the second result do not coincide with each other, the difference data to be output is rendered to be the difference data created immediately before a time at which the result of the determination of coincidence/noncoincidence has changed to noncoincidence.

4. The image processing apparatus as claimed in claim 1, wherein the character recognition is performed on a partial area of each of the form data and the first or second encoded form data.

5. The image processing apparatus as claimed in claim 1, wherein the result of the determination of the coincidence/noncoincidence is made as coincidence when a rate of concordance based on a number of characters is greater than or equal to a threshold value.

6. An image processing method, comprising:
creating difference data between first encoded form data and a form format corresponding to the form data, the first encoded form data being acquired by encoding form data according to a first compression parameter;
decoding the created difference data;
performing character recognition on each of the form data and the decoded difference data;
comparing a first result of the character recognition performed on the form data and a second result of the character recognition performed on the decoded difference data, and determining whether the first result and the second result coincide with each other; and
outputting the difference data based on a result of the determination of coincidence/noncoincidence of the first result and the second result.

7. The image processing method as claimed in claim 6, wherein, when the first result and the second result coincide with each other, the difference data to be output is rendered to be the difference data created when the result of the determination of coincidence/noncoincidence has become coincidence, and when the first result and the second result do not coincide with each other, another difference data is created based on second encoded form data, which is acquired by encoding the form data according to a second compression parameter having a compression ratio lower than said first compression parameter.

8. The image processing method as claimed in claim 6, wherein, when the first result and the second result coincide with each other, another difference data is created based on second encoded form data that is acquired by encoding the form data according to a second compression parameter having a compression ratio higher than said first compression parameter, and when the first result and the second result do not coincide with each other, the difference data to be output is rendered to be the difference data created immediately before a time at which the result of the determination of coincidence/noncoincidence has changed to noncoincidence.

9. The image processing method as claimed in claim 6, wherein the character recognition is performed on a partial area of each of the form data and the first or second encoded form data.

10. The image processing method as claimed in claim 6, wherein the determination of the coincidence/noncoincidence is made as coincidence when a rate of concordance based on a number of characters is greater than or equal to a threshold value.

11. A non-transitory computer readable recording medium storing an information processing program causing one or more computers to perform an image processing according to the image processing method as claimed in claim 6.

* * * * *